(12) United States Patent
Liu et al.

(10) Patent No.: US 8,036,666 B2
(45) Date of Patent: Oct. 11, 2011

(54) WIRELESS COMMUNICATION SYSTEM AND METHOD FOR SWITCHING BASE STATION THEREOF

(75) Inventors: Qi Liu, Shanghai (CN); Steve Chang, Taipei (TW); Wen-Fong Chang, Taipei (TW)

(73) Assignee: Inventec Appliances Corp., Taipei (TW)

( * ) Notice: Subject to any disclaimer, the term of this patent is extended or adjusted under 35 U.S.C. 154(b) by 390 days.

(21) Appl. No.: 12/345,619

(22) Filed: Dec. 29, 2008

(65) Prior Publication Data
US 2010/0056159 A1   Mar. 4, 2010

(30) Foreign Application Priority Data
Aug. 28, 2008 (TW) ................................ 97132995 A

(51) Int. Cl.
*H04W 36/00* (2009.01)
(52) U.S. Cl. ..... 455/440; 455/441; 455/442; 455/456.1; 455/456.2; 455/456.3

(58) Field of Classification Search .................. 455/410, 455/436, 440, 442, 441, 456.2, 456.3, 456.1; 370/331
See application file for complete search history.

(56) References Cited

U.S. PATENT DOCUMENTS

| | | | |
|---|---|---|---|
| 5,724,660 A * | 3/1998 | Kauser et al. ............... | 455/456.2 |
| 2002/0085719 A1 * | 7/2002 | Crosbie ......................... | 380/248 |
| 2007/0025296 A1 * | 2/2007 | Jung et al. .................... | 370/331 |

* cited by examiner

*Primary Examiner* — David Q Nguyen
(74) *Attorney, Agent, or Firm* — Jianq Chyun IP Office

(57) ABSTRACT

A wireless communication system and a method for switching a base station (BS) thereof are provided. In the present invention, a globe positioning system (GPS) of a mobile apparatus is capable of obtaining a location information about the mobile apparatus. On receiving the location information transmitted from the mobile apparatus, a server end apparatus switches to a corresponding BS of a serving area where the mobile apparatus is located so as to serve the mobile apparatus.

12 Claims, 3 Drawing Sheets

WIRELESS COMMUNICATION SYSTEM AND METHOD FOR SWITCHING BASE STATION THEREOF

CROSS-REFERENCE TO RELATED APPLICATION

This application claims the priority benefit of Taiwan application serial no. 97132995, filed on Aug. 28, 2008. The entirety of the above-mentioned patent application is hereby incorporated by reference herein and made a part of specification.

BACKGROUND OF THE INVENTION

1. Field of the Invention

The present invention relates to a method for switching a base station (BS), in particular, to a method for switching a BS according to the location of a mobile apparatus.

2. Description of Related Art

The wireless local area network (WLAN) is designed based on a cellular architecture. The WLAN contains a plurality of serving areas, i.e., cells. Each serving area is controlled by a base station (BS). In the cellular architecture, when a mobile apparatus moves from a serving area covered by a BS to a serving area covered by another BS, a server end apparatus monitors the signal intensity of the mobile apparatus, then automatically switches the mobile apparatus to another BS having a higher signal intensity, and automatically adapts the mobile apparatus to a suitable channel, so as to ensure the continuity of the communication of the mobile apparatus.

For example, FIG. 1 is a block diagram of a conventional wireless communication system. Referring to FIG. 1, it is assumed that a mobile apparatus intends to move from a point A to a point B. Here, the point A and the point B are located in a serving area 110 and a serving area 130, respectively. The serving area 110 and the serving area 130 are covered by a BS 120 and a BS 140, respectively.

It is assumed that the BS 120 provides services for the mobile apparatus. When a signal intensity of the BS 120 received by the mobile apparatus at the point A is higher than a switching threshold value, and a signal intensity of the BS 140 received by the mobile apparatus at the point B is lower than the switching threshold value, the server end apparatus will not switch the mobile apparatus to the BS 140, and the mobile apparatus is still served by the BS 120.

On the contrary, when the signal intensity of the BS 120 received by the mobile apparatus at the point A is lower than the switching threshold value, and the signal intensity of the BS 140 received by the mobile apparatus at the point B is higher than the switching threshold value, the server end apparatus switches the mobile apparatus to the BS 140.

However, if the switching threshold value is set too low, the switching may not occur even if the voltage of a neighboring BS is much higher than that of a current BS. Thus, the communication quality of the mobile apparatus is severely affected. Additionally, as the signal intensity is adopted to determine whether to switch a BS or not in the prior art, switching errors may easily occur.

SUMMARY OF THE INVENTION

Accordingly, the present invention is directed to a wireless communication system in an embodiment, in which a server end apparatus switches a base station (BS) according to a location information obtained by a globe positioning system (GPS) of a mobile apparatus.

The present invention is also directed to a method for switching a BS in an embodiment, in which a server end apparatus determines a BS to be switched according to a location information of a mobile apparatus.

In an embodiment of the present invention, a wireless communication system including a mobile apparatus, a plurality of BSs, and a server end apparatus is provided. The mobile apparatus has a GPS, and the GPS is capable of obtaining a location information about the mobile apparatus. Each of the BSs provides services covering a serving area, respectively. The server end apparatus then receives the location information transmitted from the mobile apparatus, and switches to one of the BSs corresponding to the serving area where the mobile apparatus is located according to the location information, so as to serve the mobile apparatus.

Further, in an embodiment of the present invention, a method for switching a BS is adapted to switch from a first BS to a second BS by a server end apparatus when a mobile apparatus moves from a first serving area to a second serving area. First, a location information transmitted from the mobile apparatus is received, and the location information is obtained from a GPS by the mobile apparatus. Then, the second serving area after the mobile apparatus moves is obtained through the location information. Finally, the mobile apparatus is served by switching from the first BS to the second BS corresponding to the second serving area.

In an embodiment of the present invention, the step of receiving the location information transmitted from the mobile apparatus further includes determining whether the mobile apparatus moves to the second serving area or not according to the location information. When the mobile apparatus does not move to the second serving area and is still located in the first serving area, the first BS continues serving the mobile apparatus. On the contrary, when the mobile apparatus moves to the second serving area, it is predicted whether the mobile apparatus intends to return to the first serving area or not according to a moving direction and a moving speed in the location information. If it is predicted that the mobile apparatus intends to return to the first serving area, the first BS continues serving the mobile apparatus; otherwise, the first BS is switched to the second BS.

In an embodiment of the present invention, the method for switching a BS further includes providing a BS distribution data. The BS distribution data is queried according to the location information, so as to obtain the second serving area where the mobile apparatus is located and the corresponding second BS.

In an embodiment of the present invention, since the second serving area after the mobile apparatus moves is obtained, a downlink data transmission rate is further predicted according to a moving speed in the location information.

In view of the above, the present invention transmits the location information about the mobile apparatus obtained by the GPS of the mobile apparatus to the server end apparatus. The server end apparatus then switches the BS according to the location information about the mobile apparatus, and predicts an advancing direction of the mobile apparatus. Therefore, the time point for switching is more accurately set, and switching errors are avoided.

In order to make the aforementioned and other objectives, features, and advantages of the present invention comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
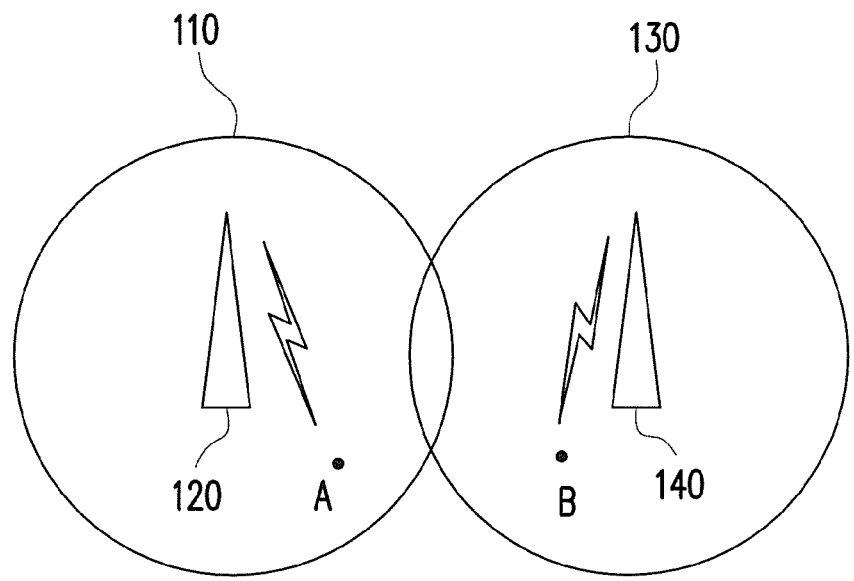
FIG. 1 is a block diagram of a conventional wireless communication system.

Reference will now be made in detail to the present embodiments of the invention, examples of which are illustrated in the accompanying drawings. Wherever possible, the same reference numbers are used in the drawings and the description to refer to the same or like parts.

In the conventional wireless communication system, a server end apparatus determines whether to switch a BS or not according to the signal intensity of the BS received by a mobile apparatus. However, this method often results in switching errors of the BS. Therefore, the present invention provides a wireless communication system and a method for switching a BS thereof. In order to have a further understanding of the present invention, embodiments are given below as examples of implementing the invention.

Figure 2:
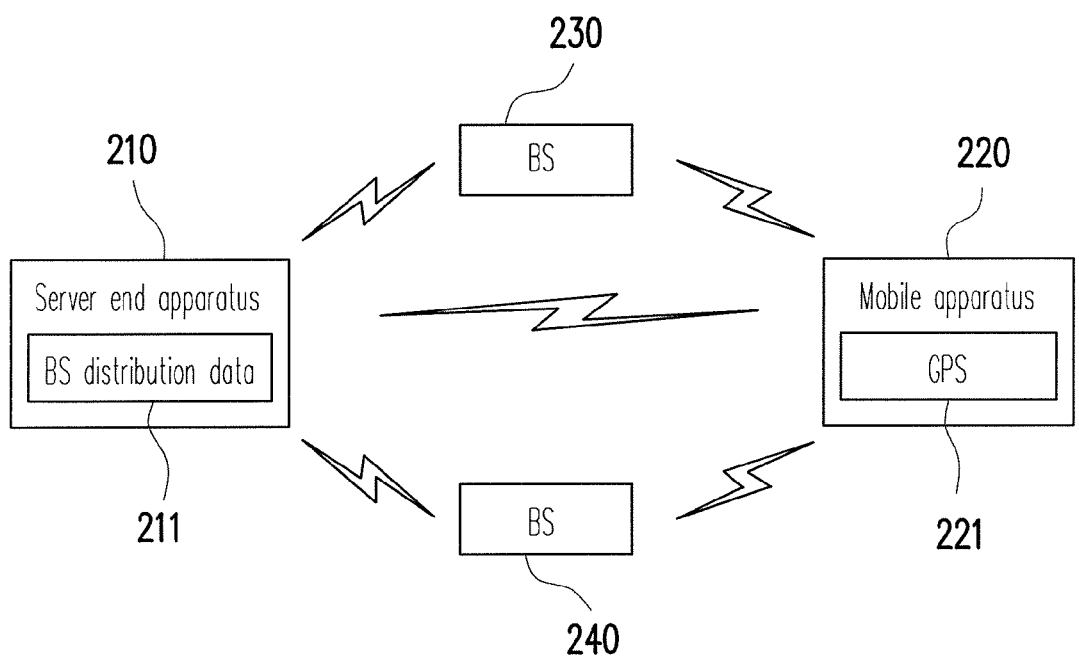
FIG. 2 is a block diagram of a wireless communication system according to an embodiment of the present invention.

FIG. 2 is a block diagram of a wireless communication system according to an embodiment of the present invention. Referring to FIG. 2, the wireless communication system 200 includes a server end apparatus 210, a mobile apparatus 220 having a GPS 221, a BS 230, and a BS 240. For ease of illustration, only the BS 230 and the BS 240 are exemplified in this embodiment. Moreover, the number of the BSs is not limited herein.

Figure 3:
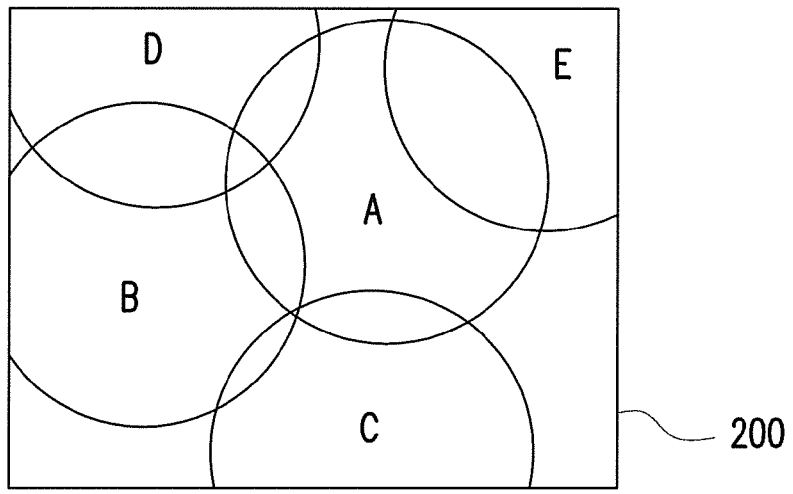
FIG. 3 is a schematic view of serving areas of a wireless communication system according to an embodiment of the present invention.

Services provided by the BS 230 and the BS 240 cover a serving area, respectively. In particular, the wireless communication system 200 includes a plurality of serving areas, and each serving area is disposed with a BS. For example, FIG. 3 is a schematic view of serving areas of the wireless communication system according to an embodiment of the present invention. Referring to FIG. 3, the wireless communication system 200 includes serving areas A to E. Each of the serving areas A to E has a BS (not shown), and the BS is capable of establishing a connection with the mobile apparatus in the serving area through radio waves.

The mobile apparatus 220 has the GPS 221, and the GPS 221 is capable of obtaining a location information about the mobile apparatus 220. The mobile apparatus 220 is, for example, a cellular phone or a personal digital assistant (PDA). After obtaining the location information, the mobile apparatus 220 transmits the location information to the server end apparatus 210.

The server end apparatus 210 selects a more suitable BS between the BS 230 and the BS 240 to serve the mobile apparatus 220. For a cellular mobile telephone system, the server end apparatus 210 is, for example, a mobile switching center (MSC). On receiving the location information transmitted from the mobile apparatus 220, the server end apparatus 210 switches to the BS corresponding to the serving area where the mobile apparatus 220 is located according to the location information, so as to serve the mobile apparatus 220.

The server end apparatus 210 further includes a BS distribution data 211. The coverage of the plurality of serving areas and the corresponding BSs are recorded in the BS distribution data 211 (for example, the coverage of the serving areas is recorded in longitude and latitude).

Figure 4:
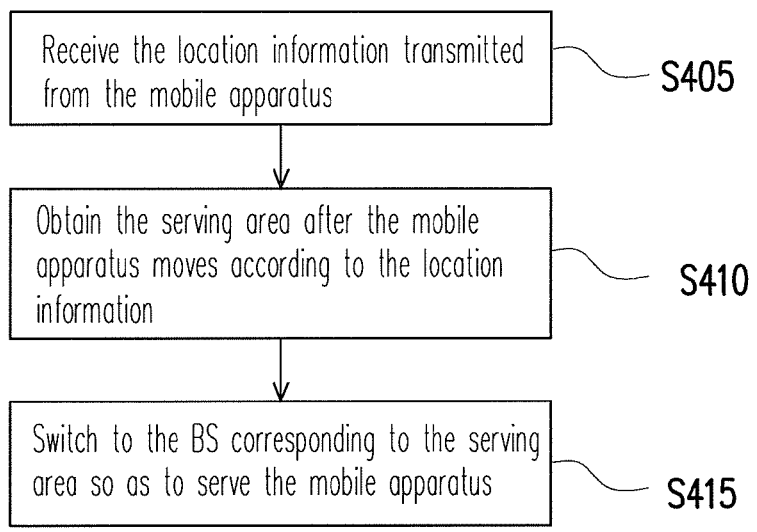
FIG. 4 is a flow chart of a method for switching a BS according to an embodiment of the present invention.

In order to illustrate the method for switching a BS more clearly, another embodiment is given below to describe in detail the process of the method. FIG. 4 is a flow chart of a method for switching a BS according to an embodiment of the present invention. Referring to FIGS. 2, 3, and 4 at the same time, in this embodiment, it is assumed that the mobile apparatus 220 intends to move from a serving area D to a serving area A, the BS 230 is disposed in the serving area D, and the BS 240 is disposed in the serving area A.

First, in Step S405, when the mobile apparatus 220 moves from the serving area D to the serving area A, the server end apparatus 210 receives the location information transmitted from the mobile apparatus 220. That is, the mobile apparatus 220 utilizes the GPS 221 to obtain the current location information of the serving area A, including a location coordinate (longitude and latitude), a moving speed, and a moving direction. Subsequently, the mobile apparatus 220 transmits the location information to the server end apparatus 210.

Next, in Step S410, the server end apparatus 210 learns from the location information that the mobile apparatus 220 moves to the serving area A. Further, the server end apparatus 210 queries the BS distribution data 211 according to the location information. The server end apparatus 210 compares the location coordinate in the location information with the BS distribution data, so as to query that the location coordinate falls in the serving area A. When the server end apparatus 210 queries that the mobile apparatus 220 is located in the serving area A, the server end apparatus 210 may also figure out the BS 240 corresponding to the serving area A.

Finally, in Step S415, the server end apparatus 210 switches from the BS 230 corresponding to the serving area D to the BS 240 corresponding to the serving area A, so as to serve the mobile apparatus 220 through the BS 240. For example, the server end apparatus 210 first interrupts a connection between the mobile apparatus 220 and the BS 230, and then establishes a connection between the mobile apparatus 220 and the BS 240. Or, the server end apparatus 210 first maintains the connection between the mobile apparatus 220 and the BS 230, and interrupts the connection between the mobile apparatus 220 and the BS 230 after establishing the connection between the mobile apparatus 220 and the BS 240.

In addition, the server end apparatus 210 further predicts a downlink data transmission rate according to the moving speed in the location information. For example, the greater the moving speed is, the smaller the downlink data transmission rate will be.

Figure 5:
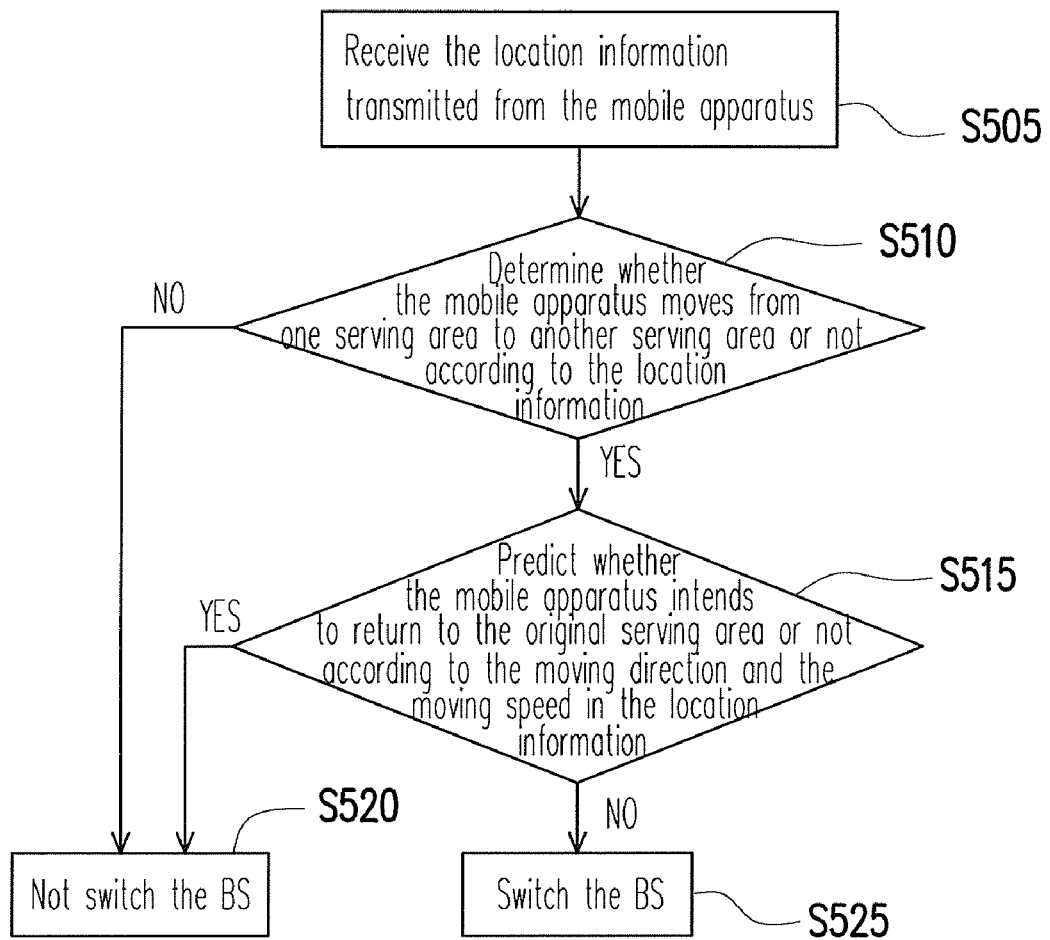
FIG. 5 is a flow chart of a method for switching a BS according to another embodiment of the present invention.

The server end apparatus also determines whether to switch a BS or not according to the moving speed and the moving direction of the mobile apparatus. An embodiment is further provided below for illustration. FIG. 5 is a flow chart of a method for switching a BS according to another embodiment of the present invention. Referring to FIGS. 2, 3, and 5 at the same time, in this embodiment, it is also assumed that the mobile apparatus 220 intends to move from the serving area D to the serving area A, the BS 230 is disposed in the serving area D, and the BS 240 is disposed in the serving area A.

First, in Step S505, when the mobile apparatus 220 moves from the serving area D to the serving area A, the server end apparatus 210 receives the location information transmitted from the mobile apparatus 220.

Next, in Step S510, the server end apparatus 210 determines whether the mobile apparatus 220 moves from the serving area D to the serving area A or not according to the location information. That is, the server end apparatus 210 compares the location coordinate in the location information with the BS distribution data, so as to determine whether the location information received currently is located in the same serving area as the location information received last time.

If the server end apparatus 210 determines that the mobile apparatus 220 does not move to the serving area A and is still located in the serving area D, the server end apparatus 210 does not switch the BS as shown in Step S520, and the BS 230 continues serving the mobile apparatus 220.

On the contrary, if the server end apparatus 210 determines that the mobile apparatus 220 moves to the serving area A, the server end apparatus 210 predicts whether the mobile apparatus 220 intends to return to the serving area D or not according to the moving direction and the moving speed in the location information, as shown in Step S515.

When the server end apparatus 210 predicts that the mobile apparatus 220 intends to return to the serving area D, the server end apparatus 210 does not switch the BS as shown in Step S520, and the BS 230 continues serving the mobile apparatus 220. That is, if the mobile apparatus 220 returns to the serving area D in a short time, the server end apparatus 210 does not switch to the BS 240. On the contrary, when the server end apparatus 210 predicts that the mobile apparatus 220 does not intend to return to the serving area D, the server end apparatus switches from the BS 230 to the BS 240, as shown in Step S525.

In addition, the above embodiments can be integrated into a computer program product. The computer program product includes all the features of the implementation of the methods and functions described herein. When the computer program product is loaded in a computer system, these methods and functions can be executed.

As described above, in the aforementioned embodiments, the server end apparatus determines whether to switch the BS or not to provide services to the mobile apparatus through a comparison between the serving area covered by the BS and the actual geographical location of the mobile apparatus. Therefore, the time point for switching is more accurately set, and switching errors are avoided.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for switching a base station (BS), adapted to switch from a first BS to a second BS by a server end apparatus when a mobile apparatus moves from a first serving area to a second serving area, the method comprising:
receiving a location information transmitted from the mobile apparatus, wherein the location information is obtained by the mobile apparatus from a globe positioning system (GPS);
obtaining the second serving area through the location information after the mobile apparatus moves;
predicting whether the mobile apparatus intends to return to the first serving area according to a moving direction and a moving speed in the location information when the mobile apparatus moves to the second serving area; and
switching from the first BS to the second BS corresponding to the second serving area so as to serve the mobile apparatus when predicting that the mobile apparatus does not intend to return to the first serving area.

2. The method for switching a BS according to claim 1, wherein after receiving the location information from the mobile apparatus, the method further comprises:
determining whether the mobile apparatus moves to the second serving area or not according to the location information; and
continuing serving the mobile apparatus by the first BS when the mobile apparatus does not move to the second serving area and is still located in the first serving area.

3. The method for switching a BS according to claim 1, wherein after predicting whether the mobile apparatus intends to return to the first serving area or not, the method further comprises:
continuing serving the mobile apparatus by the first BS when predicting that the mobile apparatus intends to return to the first serving area.

4. The method for switching a BS according to claim 1, further comprising:
providing a BS distribution data, wherein the BS distribution data is queried according to the location information, so as to obtain the second serving area where the mobile apparatus is located and the corresponding second BS.

5. The method for switching a BS according to claim 4, wherein the step of obtaining the second serving area through the location information after the mobile apparatus moves comprises:
comparing a location coordinate in the location information with the BS distribution data, so as to obtain the second serving area.

6. The method for switching a BS according to claim 1, wherein after obtaining the second serving area after the mobile apparatus moves, the method further comprises:
predicting a downlink data transmission rate according to a moving speed in the location information.

7. The method for switching a BS according to claim 1, wherein the mobile apparatus is a cellular phone or a personal digital assistant.

8. A computer program product, wherein when the computer program is loaded and executed by a computer, the method for switching a BS described in claim 1 is accomplished.

9. A wireless communication system, comprising:
a mobile apparatus, provided with a globe positioning system (GPS), wherein the GPS is capable of obtaining a location information about the mobile apparatus;
a plurality of base stations (BSs), each providing services covering a serving area, respectively, wherein the BSs comprise a first BS and a second BS, and the services provided by the first BS and the second BS cover a first serving area and a second serving area, respectively; and
a server end apparatus, for receiving the location information transmitted from the mobile apparatus, wherein when the mobile apparatus moves from the first serving area to the second serving area, the server end apparatus obtains the second serving area through the location information after the mobile apparatus moves, the server end apparatus further predicting whether the mobile apparatus intends to return to the first serving area or not according to a moving direction and a moving speed in the location information and switching from the first BS to the second BS.

10. The wireless communication system according to claim 9, wherein the server end apparatus further determines whether the mobile apparatus moves from the first serving area to the second serving area according to the location information, so as to continue serving the mobile apparatus by the first BS when the mobile apparatus is still located in the first serving area.

11. The wireless communication system according to claim 9, wherein when the mobile apparatus moves from the first serving area to the second serving area, the server end apparatus continues serving the mobile apparatus by the first BS when predicting that the mobile apparatus intends to return to the first serving area.

12. The wireless communication system according to claim 9, wherein the server end apparatus comprises:
 a BS distribution data, wherein the server end apparatus queries the BS distribution data according to the location information, so as to obtain the serving area where the mobile apparatus is located and the corresponding BS.

* * * * *